(12) United States Patent
Peng

(10) Patent No.: US 11,727,562 B2
(45) Date of Patent: Aug. 15, 2023

(54) SYSTEM AND METHOD FOR DIAGNOSING, MONITORING, SCREENING FOR OR EVALUATING A MUSCULOSKELETAL DISEASE OR CONDITION

(71) Applicant: StraxCorp Pty. Ltd., Melbourne (AU)

(72) Inventor: Yu Peng, Melbourne (AU)

(73) Assignee: Curvebeam AI Limited., Melbourne (AU)

( * ) Notice: Subject to any disclaimer, the term of this patent is extended or adjusted under 35 U.S.C. 154(b) by 38 days.

(21) Appl. No.: 17/370,455

(22) Filed: Jul. 8, 2021

(65) Prior Publication Data

US 2021/0334968 A1 Oct. 28, 2021

Related U.S. Application Data

(63) Continuation of application No. 16/448,460, filed on Jun. 21, 2019, now Pat. No. 11,087,463.

(51) Int. Cl.
| | |
|---|---|
| *G06N 20/00* | (2019.01) |
| *G06F 17/18* | (2006.01) |
| *G06F 18/24* | (2023.01) |
| *G06N 3/047* | (2023.01) |
| *G06T 7/00* | (2017.01) |
| *G06T 7/10* | (2017.01) |

(52) U.S. Cl.
CPC ............ *G06T 7/0012* (2013.01); *G06F 17/18* (2013.01); *G06F 18/24* (2023.01); *G06N 3/047* (2023.01); *G06N 20/00* (2019.01); *G06T 7/10* (2017.01); *G06T 2207/30008* (2013.01)

(58) Field of Classification Search
None
See application file for complete search history.

(56) References Cited

U.S. PATENT DOCUMENTS

| | | | |
|---|---|---|---|
| 9,064,320 B2 | 6/2015 | Zebaze et al. | |
| 2002/0196966 A1* | 12/2002 | Jiang | G06T 7/0012 382/132 |
| 2004/0106868 A1* | 6/2004 | Liew | A61P 19/00 600/442 |

(Continued)

FOREIGN PATENT DOCUMENTS

| | | |
|---|---|---|
| WO | WO-2000/072452 A2 | 11/2000 |
| WO | WO-2014/070753 A2 | 5/2014 |
| WO | WO-2019/084697 A1 | 5/2019 |

OTHER PUBLICATIONS

Australian Examination Report No. 3 (Application No. 2020230279), dated Sep. 14, 2021.

(Continued)

*Primary Examiner* — Idowu O Osifade
(74) *Attorney, Agent, or Firm* — Nixon Peabody LLP; Jeffrey L. Costellia

(57) ABSTRACT

A computer-implemented image analysis method and system. The method comprises: quantifying one or more features segmented and identified from a medical image of a subject; extracting clinically relevant features from non-image data pertaining to the subject; assessing the features segmented from the medical image and the features extracted from the non-image data with a trained machine learning model; and outputting one or more results of the assessing of the features.

20 Claims, 8 Drawing Sheets
(1 of 8 Drawing Sheet(s) Filed in Color)

(56) References Cited

U.S. PATENT DOCUMENTS

| | | |
|---|---|---|
| 2015/0018664 A1 | 1/2015 | Pereira et al. |
| 2016/0206660 A1* | 7/2016 | Shi .................. C12N 5/0662 |
| 2016/0275678 A1 | 9/2016 | Onal et al. |
| 2018/0214105 A1 | 8/2018 | Anavi et al. |
| 2018/0247020 A1 | 8/2018 | Itu et al. |
| 2019/0027252 A1 | 1/2019 | Calhoun et al. |
| 2019/0139641 A1 | 5/2019 | Itu et al. |

OTHER PUBLICATIONS

Raudaschl, Patrik, et al., "Statistical Shape and Appearance Models for Bone Quality Assessment", Statistical Shape and Deformation Analysis; 2017, Chapter 15, pp. 409-443, Elsevier Ltd., Austria.
Australian Examination Report (Application No. 2019204376) dated Aug. 6, 2019.
Australian Second Full Examination Report for Application No. 2019204376, dated May 11, 2020.
European Search Report (Application No. 20177205.0) dated Nov. 2, 2020.

* cited by examiner

Report 200

Subject/Patient Details 202

Bone Volume Fraction Map 204

Reference Bone 210

Patient Bone 212

HIGH
BVF Key
214
0%

Scores 206

Fragility Score — 234, 216 75%, 236, 20%, 70%, 90%, 222, 228

Porosity Score — 234, 37%, 218, 236, 30%, 46%, 60%, 224, 230

Trabecular Score — 220, 1%, 236, 234, 0%, 2%, 10%, 226, 232

Score Graphs 208

240

242

244

SYSTEM AND METHOD FOR DIAGNOSING, MONITORING, SCREENING FOR OR EVALUATING A MUSCULOSKELETAL DISEASE OR CONDITION

RELATED APPLICATION

This application is a continuation of and claims the benefit of the filing and priority dates of application Ser. No. 16/448,460 filed 21 Jun. 2019, the content of which as filed is incorporated herein by reference in its entirety.

FIELD OF THE INVENTION

The present invention relates to an image analysis method and system, of particular but by no means exclusive application in medical imaging, such as to diagnose and monitor diseases or conditions in (e.g. musculoskeletal) imaging. The region of interest may be a 2D region or 3D volume in such medical images. Possible medical imaging applications include Computed Tomography (CT), Magnetic Resonance (MR), Ultrasound, and Pathology Scanner imaging.

BACKGROUND

The morbidity, mortality and costs associated with the occurrence of musculoskeletal related diseases are increasing, in part because longevity increases the proportion of the old population. Early detection of musculoskeletal disease facilitates intervention that may reduce disease progression or minimize negative consequences (such as bone fractures).

In the field of musculoskeletal imaging, various approaches are used to detect musculoskeletal disease. For example, bone biopsy is used to detect bone cancer or other bone diseases, and can measure the characteristic of tissues accurately. However, bone biopsies are invasive and can cause pain and scaring.

In other approaches, musculoskeletal diseases are assessed by analysing musculoskeletal images to identify or quantify abnormalities, the images collected with various imaging modalities—including DXA (Dual-energy X-ray Absorptiometry), CT (Computed Tomography), MRI (Magnetic Resonance Imaging) and X-ray scanner. Each modality has specific advantages in the screening and evaluation of musculoskeletal diseases (such as bone fragility, osteoarthritis, rheumatoid arthritis, osteomalacia and bone deformity).

For example, HRpQCT (High-Resolution peripheral Quantitative Computed Tomography) is high resolution, low radiation and non-invasive; it is used to assess three important determinants of bone quality: microarchitecture, mineralisation and biomechanical properties.

There exist manual, semi-manual, and automated techniques for assessing musculoskeletal diseases, involving various imaging modalities. For example, the BMB (Bone Marrow Burden) score is an MRI scoring method for manually assessing the extent of bone marrow involvement in Gaucher disease. Radiologists measure a BMB score with an MRI image of lumbar spine and femur, using signal intensity and distribution according to ranking criteria. For example, one known score ranges from 0 to 8 for the lumbar spine and from 0 to 8 for the femurs, for an overall score of 0 to 16. A higher total BMB score indicates more severe bone marrow involvement.

Measuring bone mineral density using DXA images is performed semi-manually. The spine or hip are scanned by DXA. The radiologist or doctor selects the region of interest (such as different spine sections on the spine scan and femoral neck on the hip scan). The bone mineral density of the selected regions is determined based on a predefined density calibration formula. The measured density value is converted to a T score by comparing it with measurements from a population of young adults of the same sex with peak bone mass. A T score of $\geq -1$ is considered normal; a T score $-2.5 < T < -1$ is classified as osteopenia; a T score of $\leq -2.5$ is defined as osteoporosis. The T score is considered by a clinician when he or she is assessing the risk of fracture development and whether treatment should be recommended.

However, major concerns in manual or semi-manual analyses of musculoskeletal imaging include labour-intensiveness and reproducibility. Accuracy and reproducibility cannot be guaranteed, owing to the subjectivity in the measurements and their evaluation.

One existing automated method for assessing musculoskeletal images is disclosed in U.S. Pat. No. 906,432, entitled "Method and system for image analysis of selected tissue structures". This method automatically analyses and assesses a musculoskeletal image, such as a wrist CT scan. The method can be used automatically to extract the radius bone from the wrist CT scan, segment the radius bone into microstructures (viz. compact cortex, transitional zone and trabecular region), and quantify the cortical porosity and trabecular density.

Known methods have focused primarily on each measurement individually, which is helpful to understand whether certain attributes of musculoskeletal can discriminate between those with and without disease. For example, the BMB score assesses the involvement of bone marrow only in Gaucher disease; the BMD score evaluates the contributions of bone mineral density only to the fracture risk; cortical porosity measures an important attribute of the bone but does not provide complete information on bone microstructure.

SUMMARY

According to a first aspect of the present invention, there is provided a computer-implemented image analysis method, comprising:

quantifying one or more features (comprising, for example, structures or materials) segmented and identified from a medical image of a subject;

extracting clinically relevant features from non-image data pertaining to the subject;

assessing the features segmented from the medical image and the features extracted from the non-image data with a trained machine learning model; and outputting one or more results of the assessing of the features.

Thus, by combining a plurality of features extracted from both image and non-image data using machine learning algorithms (such as deep learning algorithms), the present invention can be used to diagnose and monitor diseases or conditions in medical imaging, such as musculoskeletal images.

In an embodiment, the method includes receiving the image, segmenting one or more features from the image, and identifying the features segmented from the image.

In an embodiment, the method includes receiving the image with features segmented therefrom, and identifying the features segmented from the image.

In an embodiment, the segmenting and identifying are implemented with a machine learning algorithm trained segmentation and identification model configured to segment and identify the features from the image. In an example, the trained segmentation and identification model comprises a deep convolutional neural network trained model.

In an embodiment, the trained machine learning model is a disease classification model.

In an embodiment, the trained machine learning model is a model trained using features extracted from patient data and labels or annotations indicating disease or non-disease.

In an embodiment, the trained machine learning model comprises a deep learning neural network or other machine learning algorithms (such as a Support Vector Machine, Decision Tree or AdaBoost).

In an embodiment, the trained machine learning model is a model trained to diagnose and/or monitor one or more (e.g. musculoskeletal) diseases.

In an embodiment, the method further comprises (i) training the trained machine learning model, and/or (ii) updating (such as continually) the trained machine learning model with additional labelled data derived from new or newly analysed subject data.

In an embodiment, the results comprise one or more disease classifications and/or probabilities.

In an embodiment, the method further comprises generating a report based on at least the results. In an example, the method includes generating the report based additionally on information from a domain knowledge database.

In an embodiment, the assessing comprises a bone fragility assessment.

In an embodiment, the results include one or more fracture risk scores.

According to a second aspect of the present invention, there is provided an image analysis system, comprising:
  a feature quantifier configured to quantify one or more features (structures or materials) segmented and identified from a medical image of a subject;
  a non-image data processor configured to extract clinically relevant features from non-image data pertaining to the subject;
  a feature assessor configured to assessing the features segmented from the medical image and the features extracted from the non-image data with a trained machine learning model; and
  an output configured to output one or more results of the assessing of the features.

In an embodiment, the system further comprises a segmenter and identifier configured to receive the image, segment one or more features from the image, and identify the features segmented from the image. In one example, the segmenter and identifier comprises a segmentation and identification model (that is, a segmentation and identification model trained using a machine learning algorithm) configured to segment and identify the features from the image. The trained segmentation and identification model may comprise a deep convolutional neural network trained model.

In an embodiment, the trained machine learning model is a disease classification model.

In an embodiment, the trained machine learning model is a model trained using features extracted from patient data and labels or annotations indicating disease or non-disease.

In an embodiment, the trained machine learning model comprises a deep learning neural network or other machine learning algorithms.

In an embodiment, the trained machine learning model is a model trained to diagnose and/or monitor one or more (e.g. musculoskeletal) diseases.

In an embodiment, the system further comprises a machine learning model trainer configured to update (such as continually) the trained machine learning model with additional labelled data derived from new or newly analysed subject data.

In an embodiment, the results comprise one or more disease classifications and/or probabilities.

In an embodiment, the system further comprises a report generator configured to generate a report based on at least the results. In an example, the report generator is configured to generate the report based additionally on information from a domain knowledge database (such as of the system).

In an embodiment, the feature assessor is configured to assess bone fragility.

In an embodiment, the results include one or more fracture risk scores.

According to a second aspect of the present invention, there is provided computer program code comprising instructions configured, when executed by one or more computing device, to implement the image analysis method of the first aspect. This aspect also provides a computer-readable medium (which may be non-transitory) comprising such computer program code.

It should be noted that any of the various individual features of each of the above aspects of the invention, and any of the various individual features of the embodiments described herein including in the claims, can be combined as suitable and desired.

BRIEF DESCRIPTION OF THE DRAWING

The patent or application file contains at least one drawing executed in color. Copies of this patent or patent application publication with color drawings(s) will be provided by the Office upon request and payment of the necessary fee.

In order that the invention may be more clearly ascertained, embodiments will now be described by way of example with reference to the following drawing, in which.

DETAILED DESCRIPTION

Figure 1:
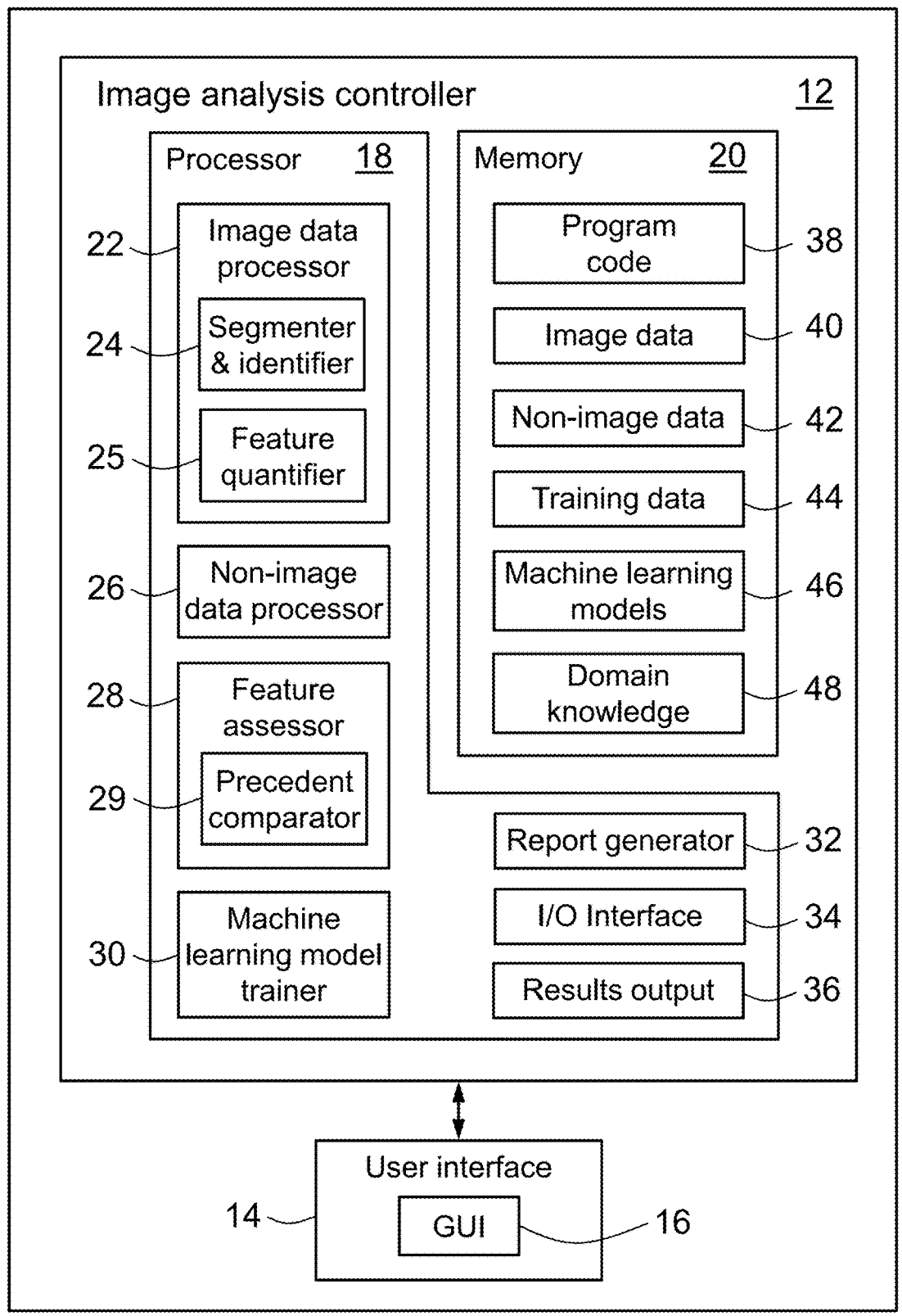
FIG. 1 is a schematic view of a medical image analysis system according to an embodiment of the present invention.

FIG. 1 is a schematic view of an image analysis system in the form of a medical image analysis system 10 according to an embodiment of the present invention.

Referring to FIG. 1, system 10 comprises an image analysis controller 12 and a user interface 14 (including a GUI 16). User interface 14 typically comprises one or more displays (on one or more of which may be displayed the GUI 16), a keyboard and a mouse, and optionally a printer. Image analysis controller 12 includes at least one processor 18 and a memory 20.

System 10 may be implemented, for example, as a combination of software and hardware on a computer (such as a personal computer or mobile computing device), or as a dedicated image segmentation system. System 10 may optionally be distributed; for example, some or all of the components of memory 20 may be located remotely from processor 18; user interface 14 may be located remotely from memory 20 and/or from processor 18 and, indeed, may comprise a web browser and a mobile device application.

Memory 20 is in data communication with processor 18, and typically comprises both volatile and non-volatile memory (and may include more than one of each type of memory), including RAM (Random Access Memory), ROM and one or more mass storage devices.

As is discussed in greater detail below, processor 18 includes an image data processor 22 (which includes a segmenter and identifier 24 and a feature quantifier 25), a non-image data processor 26, a feature assessor 28 (which includes a precedent comparator 29), a machine learning model trainer 30, a report generator 32, an I/O interface 34 and an output in the form of a results output 36. Memory 20 includes program code 38, image data 40, non-image data 42, training data 44, trained machine learning models 46, and domain knowledge 48. Image analysis controller 12 is implemented, at least in part, by processor 18 executing program code 38 from memory 20.

In broad terms, I/O interface 34 is configured to read or receive image data and non-image data (such as in DICOM format) pertaining to subjects or patients into image data 40 and non-image data 42 of memory 20 for analysis. Image data processor 22, using segmenter and identifier 24 and feature quantifier 25, segments (i.e. extracts) and quantifies features from the image data, non-image data processor 26 extracts features from the non-image data, feature assessor 28 processes the features with one or more of machine learning models 46, then I/O interface 34 outputs the result of the analysis to, for example, results output 36 and/or to GUI 16.

System 10 employs artificial intelligence (such as a deep neural network), other machine learning algorithms and computer vision algorithms, to automate—with accurately and reproducibly—feature extraction and quantitation of image features, of particular value in analysing musculoskeletal images. The results are suitable for subsequent use in locating sites of musculoskeletal disease, for diagnosing musculoskeletal disease, and for monitoring disease progression.

Referring to FIG. 1, system 10 is configured to receive two types of subject or patient data: image data (e.g. medical images acquired by one or more image modalities at one or more anatomical sites) and non-image data (structured patient data, such as clinical history data and questionnaire data, and unstructured patient data, such as doctors' notes and voice records). System 10 stores these data in image data 40 and non-image data 42, respectively. The different data forms and structures of the non-image data determine the operation of non-image data processor 26.

Image data processor 22 comprises two components: segmenter and identifier 24 is configured to perform segmentation and identification, and feature quantifier 25 configured to perform feature quantification. The image data 40 are processed by image data processor 22 which, using segmenter and identifier 24, automatically segments and identifies clinically relevant structures, features or materials from, in this embodiment, the medical image of the subject or patient, then feature quantifier 25 quantifies the segmented and identified clinically relevant structures, features, materials or combinations thereof. It should be noted, however, that in some embodiments system 10 may be configured to receive images that have already been segmented (with, optionally, the segmented features already identified), such that segmenter and identifier 24, or its use, may be omitted.

In this embodiment, the segmentation and identification is implemented with a conventional (i.e. non-machine learning) image processing method, such as thresholding, contour detection, or blob detection, or according to the method disclosed in U.S. Pat. No. 9,064,320 (entitled "Method and system for image analysis of selected tissue structures").

However, in some other embodiments, segmenter and identifier 24 comprises a machine learning algorithm trained segmentation and identification model configured to segment and identify the structures or features of interest from the image. For example, in a bone fragility application, such a model—trained using a deep convolutional neural network—may be used to segment and identify radius bone from a wrist HRpQCT scan; the training data may be annotated wrist HRpQCT scans that distinguish the voxels of the radius bone, ulna bone, and surrounding material.

The non-image data are processed by non-image data processor 26, which extracts clinically relevant features from the non-image data.

The quantitative features obtained from both the image data and non-image data are inputted into a machine learning model 46 by features assessor 28. Machine learning model 46 is pre-trained using training data with labels, that is, annotations that constitute the 'ground truth' for machine learning. For example, to train a bone segmentation model, the training data typically comprises original images and the corresponding ground truth, hence the images in which the bones have been annotated. To train a disease classification model, the training data typically comprises the features extracted from patient data and the corresponding ground truth, which are the labels/annotations indicating disease or non-disease. (The terms 'label' and 'annotation' are essentially interchangeably, but 'label' is generally reserved herein for a disease or condition, with 'annotation' generally reserved for image annotation in image segmentation/identification machine learning models.)

In this embodiment, processor 18 includes a machine learning model trainer 30, configured to train machine learning models 46 (and to retrain or update train machine learning models 46, as discussed below) using training data 44 (which may include new subject data). In other embodiments, however, machine learning model trainer 30 may be configured or used only to retrain or update train machine learning models 46.

Various machine learning algorithms (using features from both image and non-image data) may be used to train the machine learning models 46 employed in this embodiment to diagnose and monitor musculoskeletal diseases, etc., such as a deep learning neural network (which is preferred) or other machine learning algorithms such as Support Vector Machine, Decision Tree and AdaBoost.

In one implementation, a pre-trained machine learning model 46 is updated continually with additional labelled data derived from newly analysed patient data.

Thus, feature assessor 28 evaluate and assesses the features using a machine learning model 46, and then outputs results (in the form of, for example, classifications and probabilities) to report generator 32. Report generator 32 generates a report based on these results. Report generator 32 may also pull additional information from domain knowledge 48, and combine that information with the results, both being presented in the report.

For example, in an embodiment of bone fragility assessment application, feature assessor 28—using a machine learning model 46—may output a result comprising a fracture risk score. Report generator 32 may be configured to pull information indicated by this score from domain knowledge 48, such as information to assist in the interpretation of the score. Report generator 32 can then present both the score and the information in a report.

The ultimate report is outputted via results output 36 and/or user interface 14.

Figure 2A:
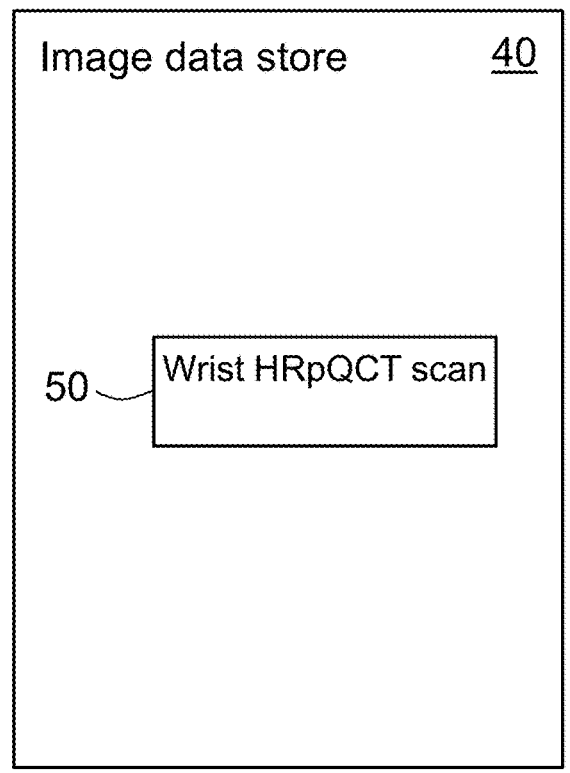
FIGS. 2A and 2B are schematic views of exemplary image data, as stored in the memory of the medical image analysis system of FIG. 1.
Figure 2B:
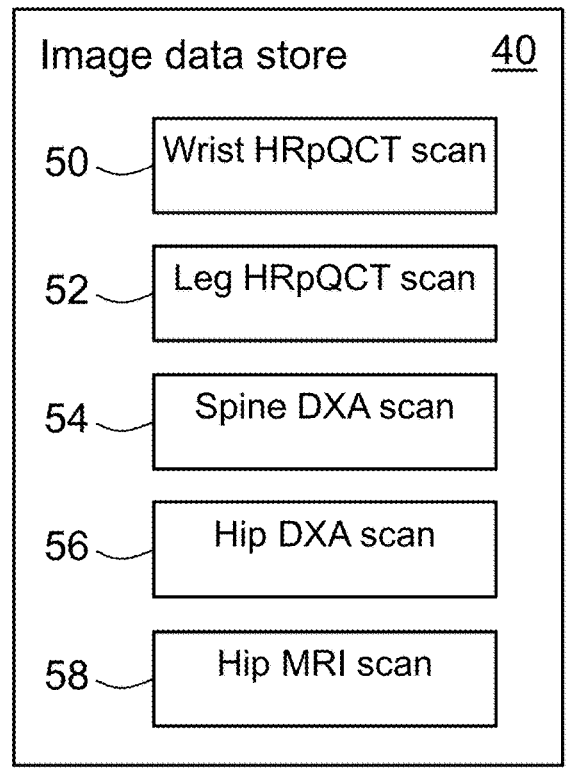

FIGS. 2A and 2B are schematic views of exemplary image data, as stored in image data 40. The image data comprise clinically relevant medical images of the subject or patient, typically images acquired by one or more imaging modalities at one or more anatomical sites.

For example, in the example of bone fragility, the input image data may comprise a wrist HRPpQCT scan 50, as illustrated in FIG. 2A. In another example, it may be desired to analyse both the peripheral and central skeletal so, as depicted in FIG. 2B, the input image data may comprise a wrist HRpQCT scan 50, a leg HRpQCT scan 52, a spine DXA scan 54, and a hip DXA scan 56 (and, if bone marrow information is optionally incorporated, a hip MRI scan 58).

Figure 3A:
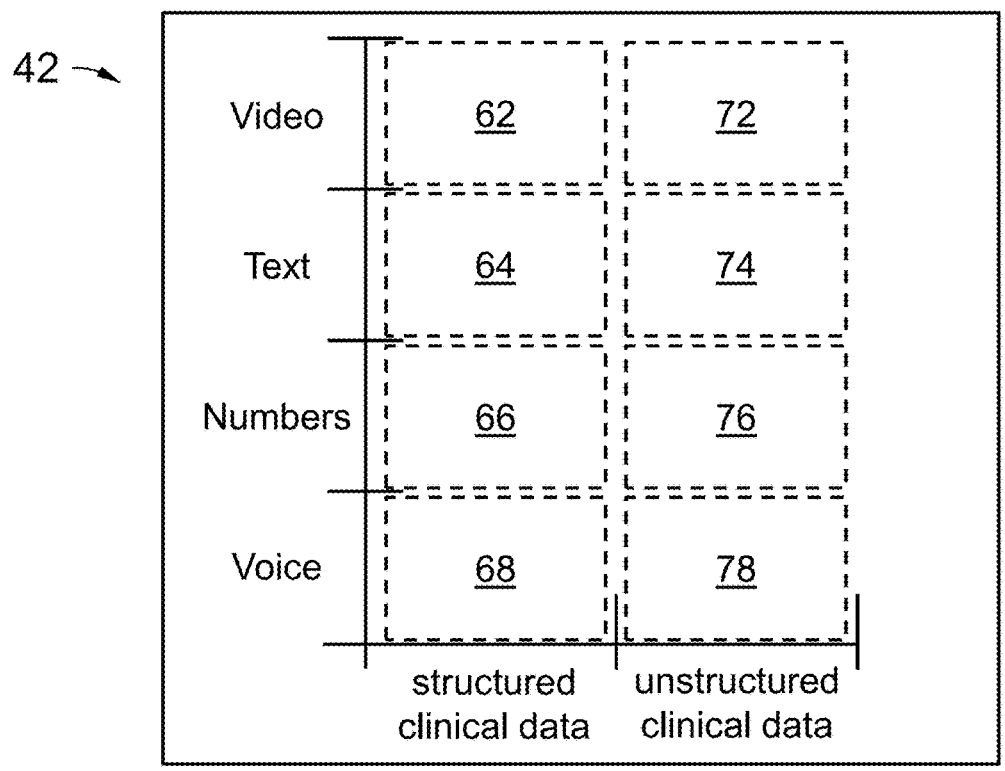
FIGS. 3A and 3B depict schematically examples of the non-image data store, unpopulated and populated respectively, of the medical image analysis system of FIG. 1.
Figure 3B:
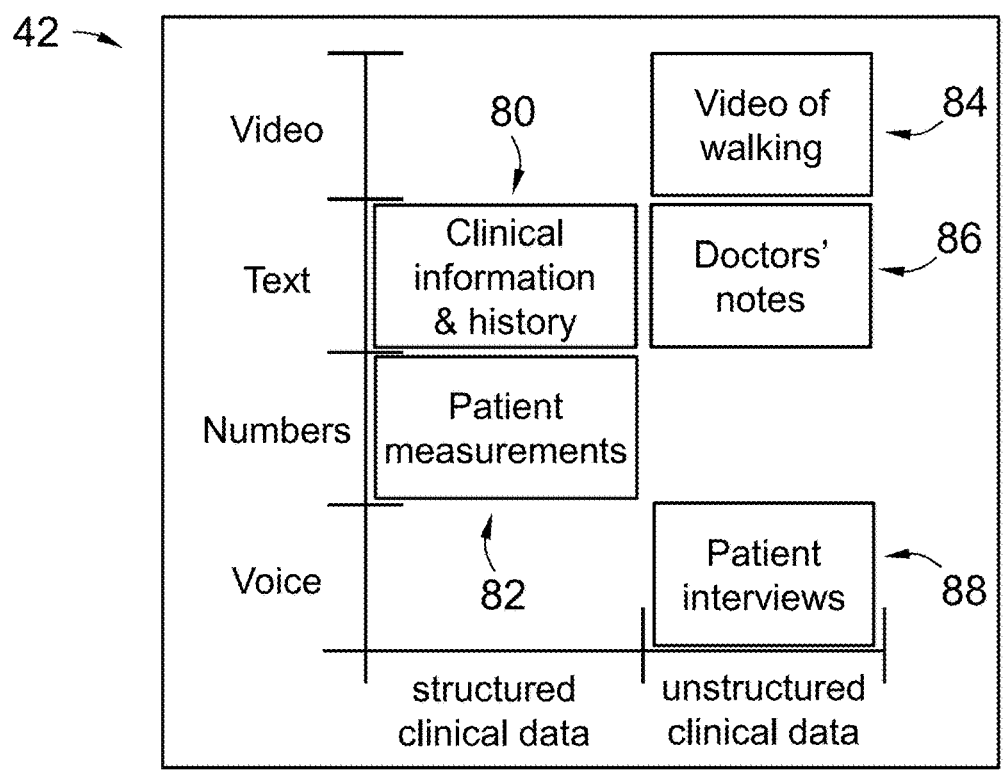

FIGS. 3A and 3B depict schematically examples of non-image data 42, unpopulated and populated respectively. The non-image data received by system 10 and stored in non-image data 42 may include a significant quantity of useful data indicative of musculoskeletal diseases. As shown in FIG. 3A, the non-image data may include patient information from various sources of structured and unstructured data, which are collected—for example—during a subject or patent's medical consultations and treatment. The structured data may include basic patient information, such as sex, age, weight, height, laboratory test results (such as blood test results and DNA test results), treatment data (such as types of medication and dosage), and questionnaire data (such as smoking and drinking habits and fracture history). The unstructured data may include text documents of laboratory results, doctors' notes and radiological reports.

As illustrated in FIG. 3A, the non-image data in non-image data 42 may be in a variety of formats, such as structured video 62, text 64, numbers 66, and/or voice 68, and unstructured video 72, text 74, numbers 76 and/or voice 78. FIG. 3B depicts an exemplary scenario, in which the non-image data comprises structured text 64 in the form of clinical information and history 80, structured numbers 66 in the form of patient measurements 82, unstructured video 72 in the form of video of the patient while walking 84, unstructured text 74 in the form of doctors' notes 86, and unstructured voice 78 in the form of patient interviews 88.

Non-image data processor 26 is configured with and employs different data processing and feature extraction techniques in processing the non-image data, in each case according to the structure and form of each portion of that data.

Figure 4:
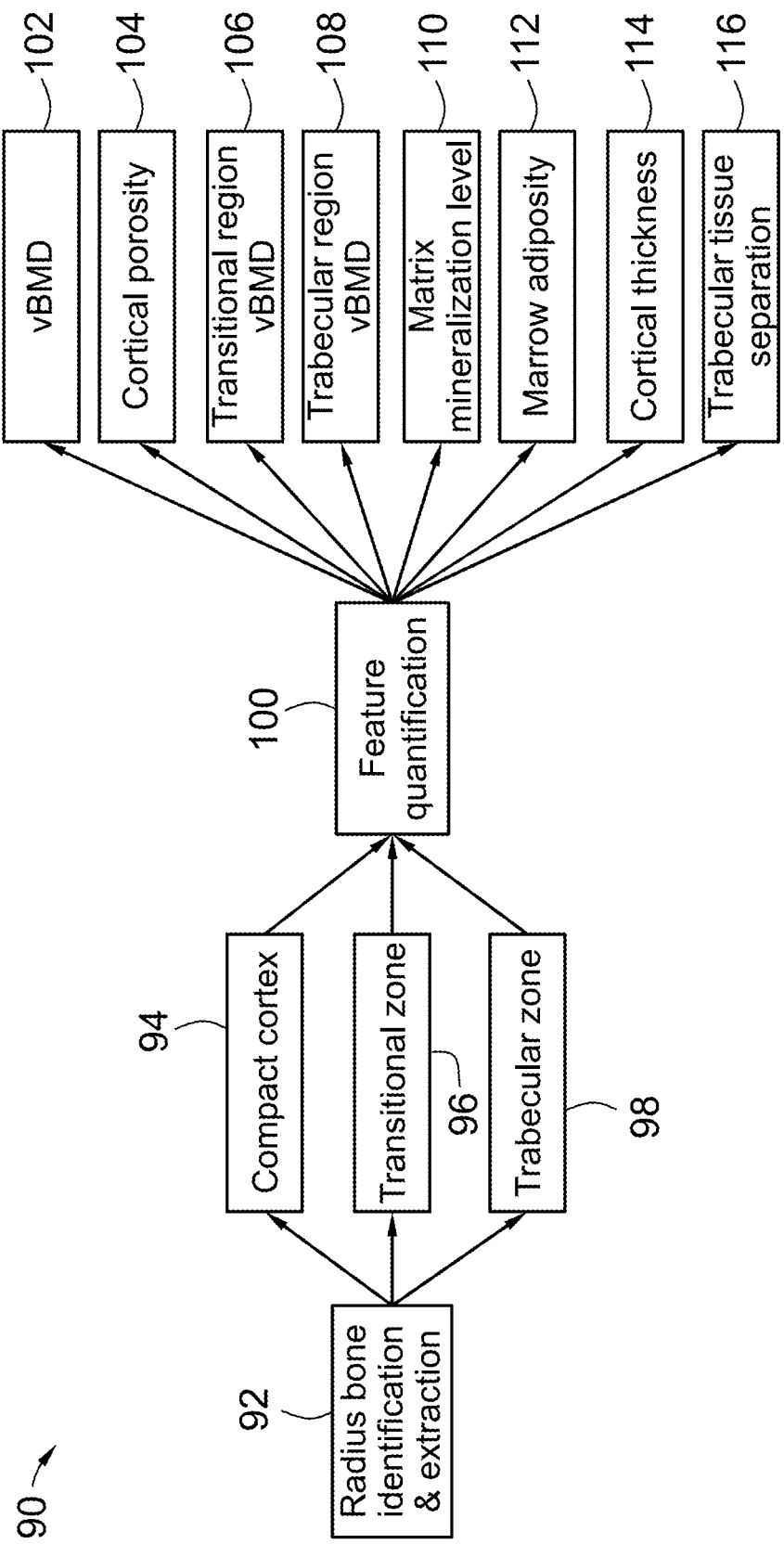
FIG. 4 is a schematic representation of the operation of the image data processor of the medical image analysis system of FIG. 1, in a bone fragility application.

FIG. 4 is a schematic representation 90 of the operation of image data processor 22, in a bone fragility application. In this example, the radius bone is identified and segmented 92 from a wrist HRpQCT scan using a pre-trained deep neural network model. The radius bone is then segmented and identified by segmenter and identifier 24, into compact cortex 94, transitional zone 96, and trabecular region 98. Next, the attributes of different structures or combination of structures are quantified by feature quantifier 25 into the following features: vBMD (the volumetric bone mineral density of the entire radius bone) 102, cortical porosity (the percentages of pores in the bone volume) 104, transitional region vBMD (the volumetric bone mineral density of the transitional region) 106, trabecular region vBMD (the volumetric bone mineral density of the trabecular region) 108, matrix mineralization level (the average percentage of the mineralized material) 110, marrow adiposity (the density of marrow adiposity in the trabecular region) 112, cortical thickness (the average thickness of compact cortex) 114, and trabecular tissue separation (the average separation of trabecular tissues) 116. These features are chosen because they have been shown to be indicative of bone fragility and risk of bone fracture. In other application, features pertinent to the condition of interest would likewise be selected.

Figure 5:
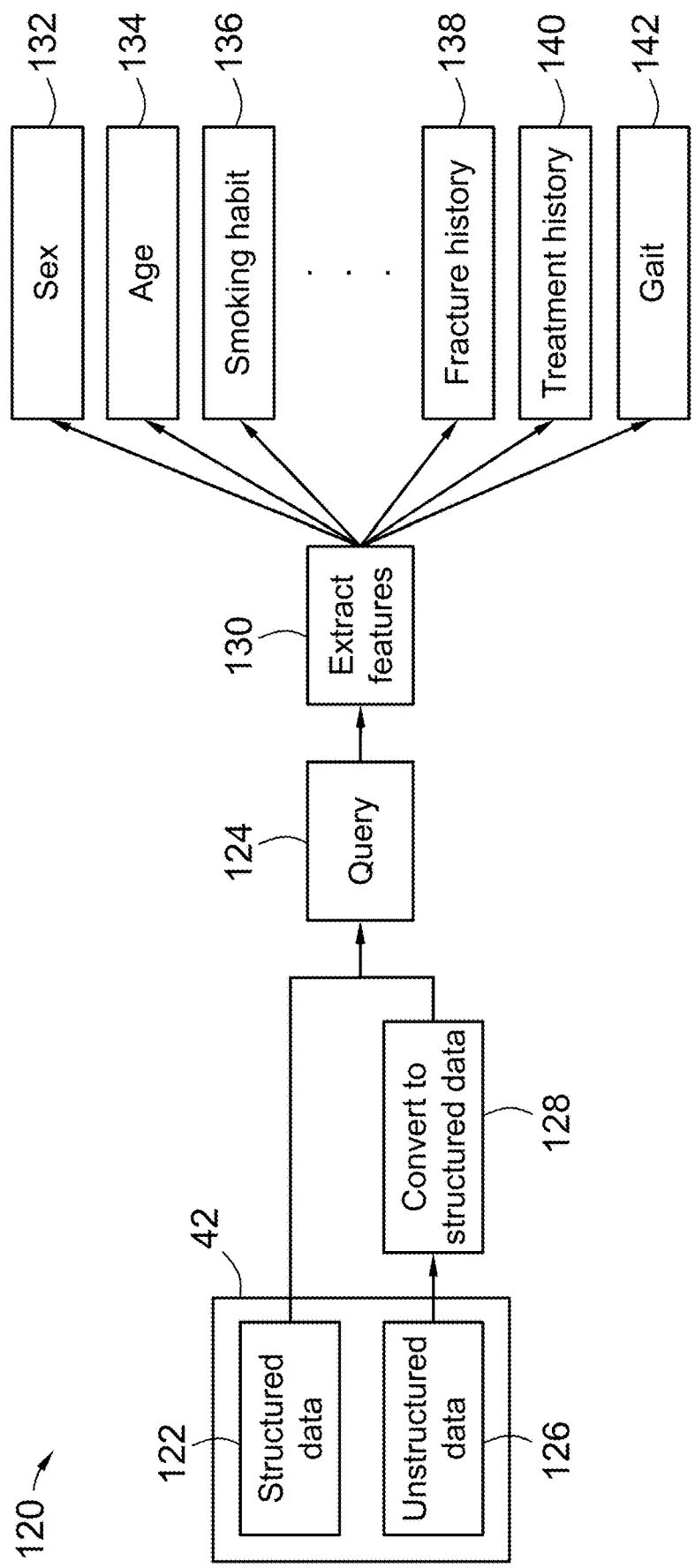
FIG. 5 is a schematic representation of the operation of the non-image data processor of the medical image analysis system of FIG. 1, on exemplary non-image data that includes structured and unstructured data.

FIG. 5 a schematic representation 120 of the operation of non-image data processor 26 on exemplary non-image data 42 that includes structured and unstructured data. Non-image data processor 26 extracts features from the non-image data with a variety of tools each adapted to extract types of non-image data of different structure and form.

Structured data 122 are typically stored and maintained in structured data storage such as database tables, .json files, .xml files and .csv files. Non-image data processor 26 extracts features from the structured data by querying 124 the required parameters and attributes from the sources of the data, and thereby extracting the information of interest from the structured data sources. It should be noted that, in some cases, the structured data may be of complete in itself and of interest, such that no querying is required.

Unstructured data 126 may comprise doctors' notes, voice record and graphic reports, etc. so, before feature extraction, non-image data processor 26 typically converts 128 the unstructured data 126 into structured data. The conversion method employed by non-image data processor 26 is specific to each source or type of unstructured data. For example, to convert doctors' notes to structured data, non-image data processor 26 may include or employ and employ a trained model of optical character recognition (OCR) to convert 128 the notes to text recognisable by system 10. Non-image data processor 26 then parses the text (using keywords such as "fractures", "pain", "fall", etc).

In another example, non-image data processor 26 may comprise or employ a trained model of speech recognition to convert 128 the recorded voice from an interview to text recognisable by system 10. Non-image data processor 26 then segments and organises the converted text into structured data by referring to the original interview questions.

In another exemplary embodiment, the non-image data may include a video as, for example, studies have shown that patterns of walking gait are associated with fracture risk. Non-image data processor 26 processes the video and extracts 130 gait features therefrom.

Once converted 128 into structured data, non-image data processor 26 extracts features from the (previously unstructured) structured data by querying 124 the required parameters and attributes from the sources of the data. As discussed above, however, if the now structured data is complete in itself and of interest, no querying will be required; in the above example of video of walking, after converting the video into gait features— which constitute structured data—no such query 124 is required.

Ultimately, non-image data processor 26 extracts features 130 such as sex 132, age 134, smoking habit 136, fracture history 138, treatment history 140 and gait 142.

Figure 6:
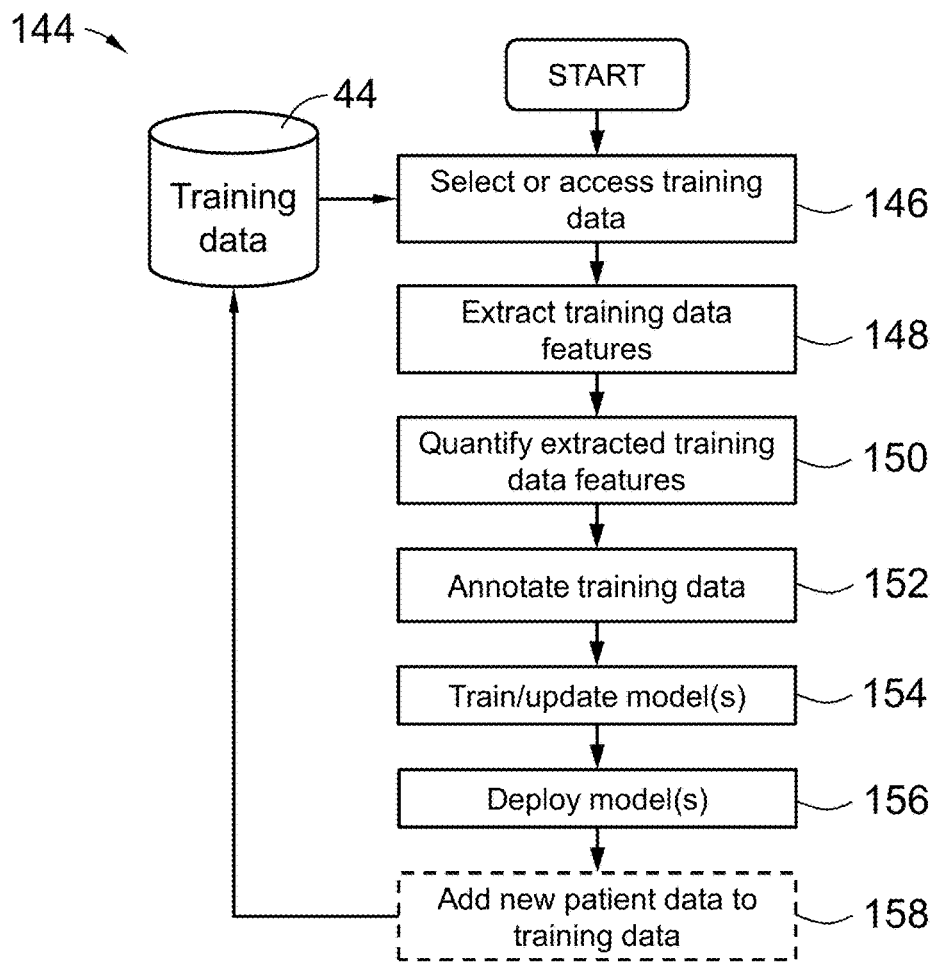
FIG. 6 is a schematic view of the offline training of the machine learning model (or models) of the feature assessor of the medical image analysis system of FIG. 1.

FIG. 6 is a schematic view 144 of the (offline) training of the model or models in machine learning models 46. Firstly, at step 146, training data are accessed or selected for processing from a database of training data 44. The training data may comprise subject image data and/or subject non-image data. Data with various attributes are selected for training to represent the target population. The training data are processed by, at step 148, extracting features and, at step 150, quantifying the extracted features, using the methods described above. The training data then comprises a set of quantitative features.

At step 152, the training data are annotated (by a human operator) with the correct diagnosis results. At step 154, the training data represented by the extracted features combined with the diagnosis labels are fed into one or more machine learning algorithms of machine learning model trainer 30 to train one or more model(s). It is to be appreciated that various machine learning algorithms may be suitable to train the model(s). It may be a black-box algorithm (e.g. a neural network) such that the process of decision making is not human-readable. It may alternatively be a white-box algorithm, (e.g. a decision tree, support vector machine, or linear discriminant analysis) such that a human can interpret the decision-making process of the model. It may also comprise a hybrid algorithm that combines both white-box and black-box algorithms.

At step 156, the model or models—now trained—are deployed for use, typically by being stored in machine learning models 46.

In use, the features extracted from new patient data are fed into the now trained machine learning model 46. As described above, a machine learning model 46 assesses the features and outputs one or more results. The results may be binary classifications, scores, or probabilities. In some embodiments, the new patient data may be added (at optional step 158) to training data 44, to be used in retraining or updating model 46.

The model training and its utility is specific to the domain; hence, so are each of the resulting machine learning models 46. Each of model 46 depends on the data and targeted conditions (e.g. a condition, such as bone fragility; a disease, such as osteoporosis, an infection, such as a particular bacterial infection). In one embodiment, one of models 46 is trained and used to diagnose one or more diseases or conditions, by generating one or more disease probability scores. In another embodiment, a plurality of models 46 may be trained and used to diagnose respective diseases. Likewise, in another embodiment, one of models 46 may be trained to generate a prediction of the likelihood of the expression of one or more symptoms (e.g. bone fracture), or a plurality of models 46 may be trained and used to generate respective predictions of the likelihood of the expression of the respective symptoms.

Figure 7:
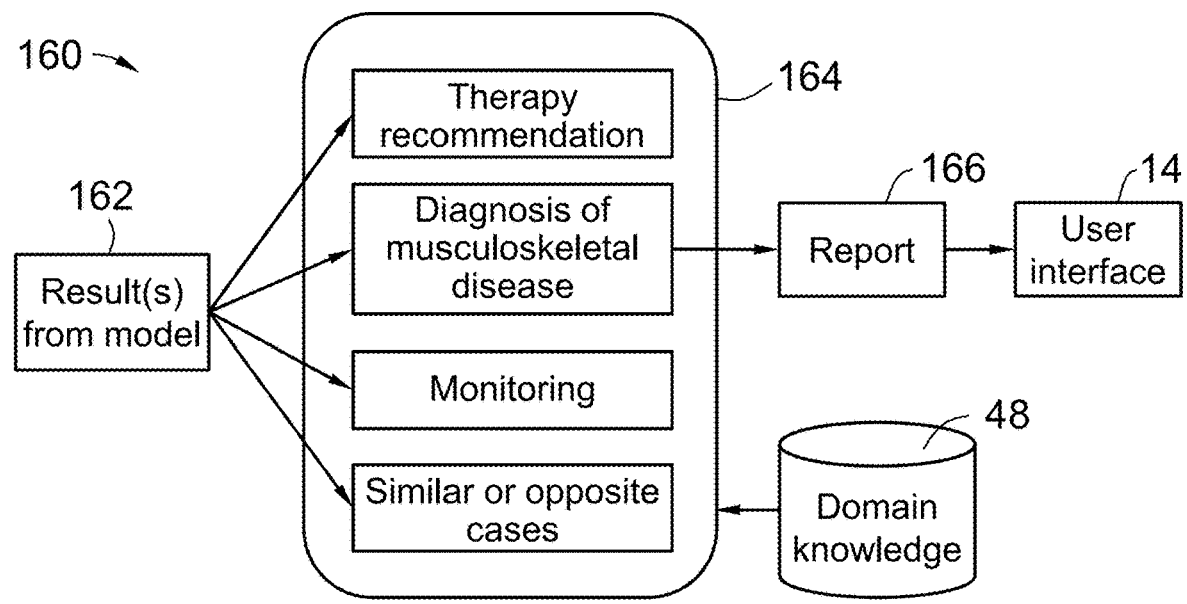
FIG. 7 is a schematic view of the report generator of the medical image analysis system of FIG. 1.

FIG. 7 is a schematic view of report generator 32, which generates reports based on at least the results 162 obtained from machine learning model 46. Report generator 32 may also, in generating the report, use information stored in domain knowledge 48. This information may include, for example, information of value to a doctor in interpreting the results outputted by features assessor 28 (such as diagnosis and treatment guidelines). For example, in the application of system 10 to the assessment of bone fractures, a doctor may be presented with treatment guidelines pertinent to different levels of bone fracture risk. The report may then include both a plurality of results generated by features assessor 28 and characterizing a bone of a subject or patient (such as a fragility score, a porosity score and a trabecular score), but also with information of use in interpreting those scores and in selecting a treatment.

This information may optionally include the diagnoses of a past cohort of (one or more) subjects or patients with comparable scores, and/or the treatment or therapy prescribed for that cohort. Indeed, in some embodiments, features assessor 28 includes an optional precedent comparator 29, configured to compare the results (in particular numerical results such as scores) generated by machine learning model 46 with such information from domain knowledge 48, to automatically form a diagnosis (by assigning a probability—or respective probabilities—that the subject has the disease or diseases) and therapy/treatment recommendation based on that comparison, and to output these to report generator 32 for inclusion in the report.

The report may also include the results of the monitoring of disease progression and the efficacy of treatment. For example, the effectiveness of the treatment may be shown if the treated subject or patient's bone fracture risk is seen to decrease in a follow-up test.

The report may also display similar or opposite cases. Presenting similar or opposite cases can be of value to a medical practitioner in assessing prognosis and determining treatment. The presentation of similar or opposite cases can be useful in training inexperienced users, or assist users to confirm the results generated from model 46. Moreover, by studying similar or opposite cases to see how past subjects or patients responded to different treatment options, a medical practitioner can assess the efficacy of a treatment (or likely efficacy of a proposed treatment) on the current patient.

All of these results and information 164 are included in the report 166 by report generator 32, which then delivers the report 166 (via results output 36) to user interface 14 (such as a web browser, a PC application or a mobile device application) for perusal by a user or users.

Figure 8:
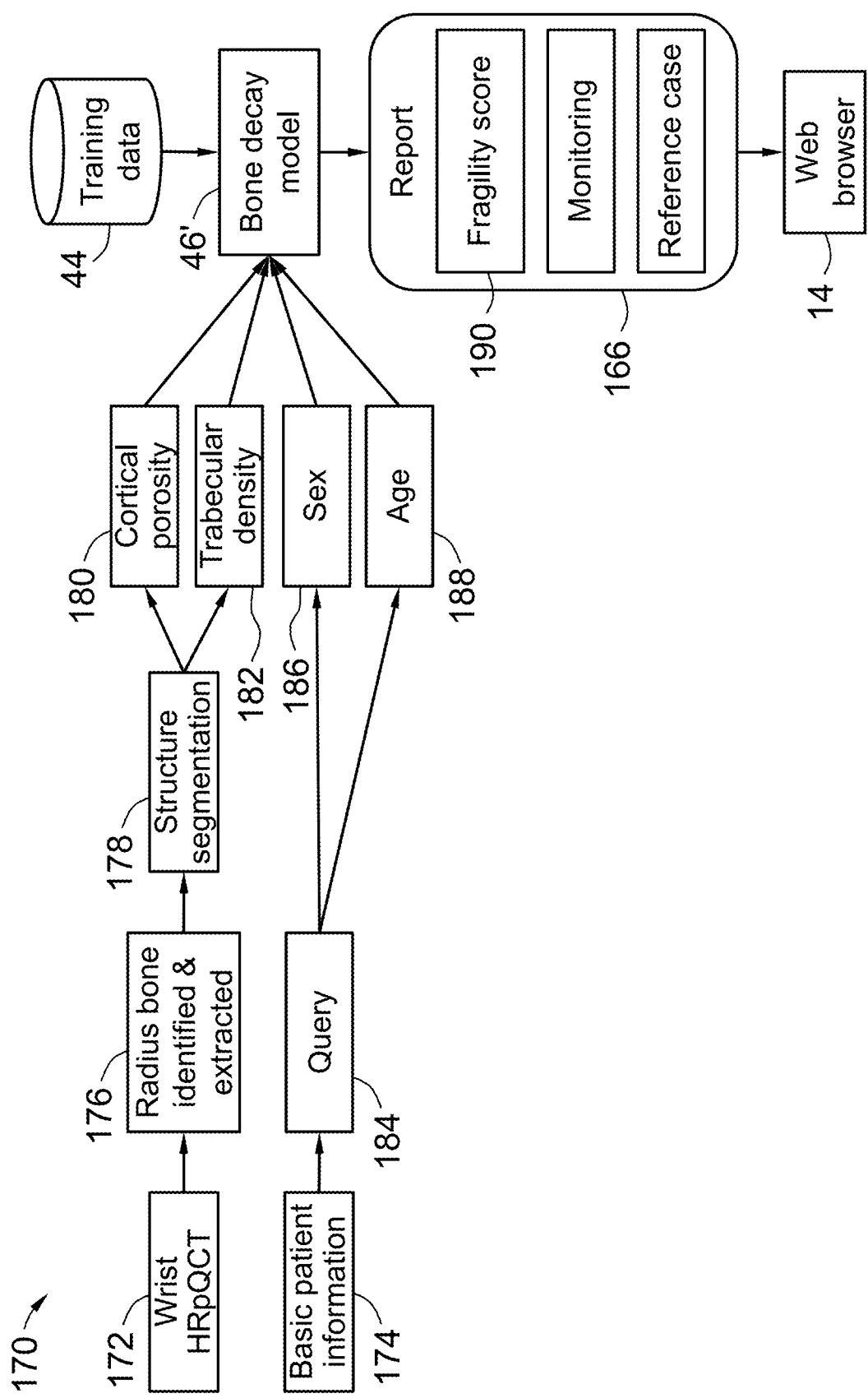
FIG. 8 illustrates an exemplary operation of the medical image analysis system of FIG. 1 in a bone fragility application, with image data comprising a wrist HRpQCT scan and non-image data comprising basic patient information.

FIG. 8 illustrates an exemplary operation of system 10 in a bone fragility application. The image data comprises a wrist HRpQCT scan 172 and the non-image data comprises basic patient information 174. As shown in FIG. 8, segmenter and identifier 24—using a trained segmentation and identification model 46' from machine learning models 46—identifies and extracts 176 the radius bone and segments 178 it into structures: compact cortex, transitional zone, and trabecular region. Based on this structural segmentation, feature quantifier 25 determines cortical porosity 180 and trabecular density 182.

Non-image data processor 26 employs a query 184 to extract sex 186 and age 188 from basic patient information 174 of the non-image data. Feature assessor 28 receives the four features cortical porosity 180, trabecular density 182, sex 186 and age 188. Feature assessor 28 employs another trained model 46" (in the form of, in this example, a bone decay model) to generate a structural fragility score 190 by assessing the four aforementioned features 180, 182, 186,

188. Alternatively, bone decay model 46' may be trained using an algorithm such as that described by Zebaze et al. in "Increased Cortical Porosity and Reduced Trabecular Density Are Not Necessarily Synonymous With Bone Loss and Microstructural Deterioration" (JBMR Plus (2018)), and with training data 44 representing the four aforementioned features 180, 182, 186, 188 and annotated with the correct bone fragility diagnosis.

Fragility score 190 and other information are used by report generator 32 to generate a report 166, which is ultimately outputted to a user interface 14 in the form of, in this example, a web browser.

Figure 9:
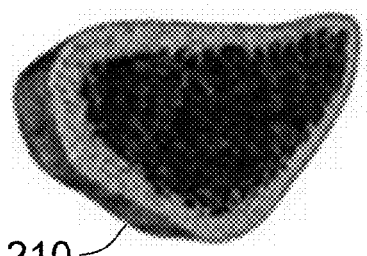
FIG. 9 is an exemplary report, generated by the report generator of the medical image analysis system of FIG. 1.
Figure 9:
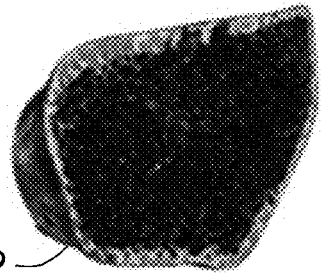
Figure 9:
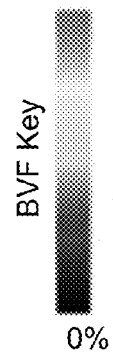
Figure 9:
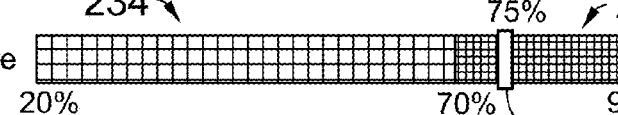
Figure 9:
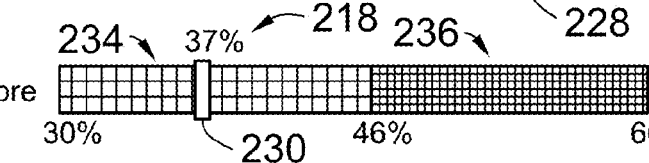
Figure 9:
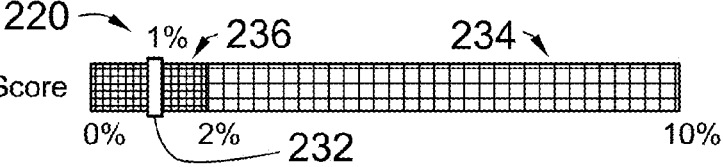
Figure 9:
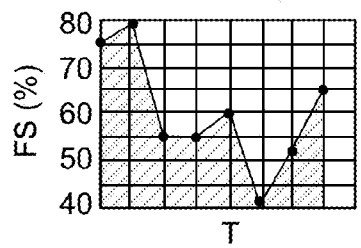
Figure 9:
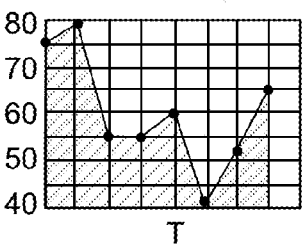
Figure 9:
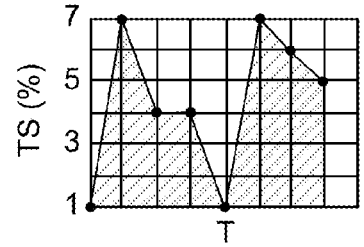

FIG. 9 is an exemplary report 200, generated by report generator 32 of system 10. Report 200 includes several registers: a subject/patient details register 202, a Bone Volume Fraction Map register 204, a Scores register 206 and a Score Graphs register 208. Subject/patient details register 202 typically includes biographical details (such as name, date of birth, sex and age), doctor's name (or doctors' names), the date of the acquisition of the data, and the date of the processing of the data (which is also the date of the report 200).

Bone Volume Fraction Map register 204 includes a false colour 3D reconstruction 210 of, in this example, the patient's radius bone volume, a false colour 3D reconstruction 212 of a corresponding reference (and typically healthy) radius bone volume, and a false colour key 214. (Note that, in FIG. 9, the colours are reproduced as a greyscale.) The false colour is used to indicate "bone volume fraction", which is the volume of mineralised bone per unit volume of the sample. The report 200 presents the reconstructions 210, 212 adjacent to one another so that a medical practitioner can readily evaluate the extent and distribution of—in this example—bone loss.

Scores register 206 includes scores generated by features assessor 28. In this example, these scores are a fragility score 216, a porosity score 218 and a trabecular score 220, expressed as percentages. Fragility score 216 is indicative of the level of coexisting cortical and trabecular deterioration. Porosity score 218 is indicative of the porosity of cortex bone. Trabecular score 220 is a score indicative of the density of the trabecular region.

Optionally, these scores 216, 218, 220 may be presented graphically on respective bars 222, 224, 226 with the score represented—for example—as a slider 228, 230, 232. Each bar, in this example, is labelled with three values: low and high values indicating the scores of the ends of the bar, and a third value indicating a division between lower and higher risk (or normal and abnormal) ranges. For example, these three values are, in the illustrated example of bar 222 of fragility score 216, respectively 20%, 90% and 70%. In the illustrated example of bar 224 of porosity score 218, respectively 20%, 60% and 46%, and in the illustrated example of bar 226 of trabecular score 220, respectively 0%, 10% and 2%.

These three values (low end, high end, and the division between lower and higher risk) are determined from precedent data, such as that contained in training data 44 or domain knowledge 48. Alternatively, some or all of the precedent data may be accessed by system 10 from one or more external databases.

The bars 222, 224, 226 may optionally be coloured or shaded to indicate the regions of lower risk 234 and higher risk 236, so that it is immediately visually clear whether a respective slider 228, 230, 232 (and hence score 216, 218, 220) corresponds to precedent data associated with high or low risk subjects. In FIG. 9, a denser shading is used to indicate the region of higher risk.

Thus, in scores register 206, the report 200 gives a fragility score 216 of 75% (indicated to be higher risk), a porosity score of 37% (indicated to be lower risk), and a trabecular score of 1% (indicated to be higher risk). These scores, neither individually nor in combination, constitute a diagnosis, as they do not identify a specific disease or affliction. However, they give the user a useful indication of symptoms and of how pronounced are those symptoms.

Score Graphs register 208 presents plots 240, 242, 244 of fragility score (FS((%))), porosity score (PS((%))), and trabecular score (TS((%))), respectfully, evolving over time T. In the illustrated example, the time axis divisions are typically a day or two, but inn general each division will represent the time between scans (which also means that the divisions in a single graph may not represent a constant time difference). In FIG. 9, plots 240, 242, 244 first indicate the scores of Scores register 206, followed in each case by subsequent scores obtained in a series of follow-up consultations; plots 240, 242, 244 thereby allow a medical practitioner to quickly assess changes in the subject, whether spontaneous, in response to treatment, or otherwise.

It will be understood by persons skilled in the art of the invention that many modifications may be made without departing from the scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A computer-implemented method of diagnosing, monitoring, screening for or evaluating a musculoskeletal disease or condition, the method comprising:
   quantifying one or more features segmented and identified from a medical image of a subject;
   extracting non-image data pertaining to the subject and pertinent to the musculoskeletal disease or condition from one or more non-image data sources;
   extracting clinically relevant features from the non-image data;
   diagnosing, monitoring, screening for or evaluating the musculoskeletal disease or condition, comprising assessing the quantified features segmented from the medical image and the features extracted from the non-image data with a trained machine learning model trained to diagnose, monitor, screen for or evaluate one or more musculoskeletal diseases or conditions; and
   outputting one or more results of the diagnosing, monitoring, screening for or evaluating the musculoskeletal disease or condition.

2. A method as claimed in claim 1, including:
   a) receiving the image and segmenting one or more features from the image, or
   b) receiving the image with features segmented therefrom; and
   identifying the features segmented from the image.

3. A method as claimed in claim 1, wherein the segmenting and identifying are implemented with a machine learning algorithm trained segmentation and identification model, or segmentation and identification model comprising a deep convolutional neural network trained model, configured to segment and identify the features from the image.

4. A method as claimed in claim 1, wherein the trained machine learning model
(a) is a disease classification model;
(b) is a model trained using features extracted from patient data and labels or annotations indicating disease or non-disease; and/or
(c) comprises a deep learning neural network or other machine learning algorithms.

5. A method as claimed in claim 1, further comprising (i) training the trained machine learning model, and/or (ii) updating the trained machine learning model with additional labelled data derived from new or newly analysed subject data.

6. A method as claimed in claim 1, wherein the results comprise (i) one or more disease classifications; (ii) one or more disease probabilities; and/or (iii) one or more fracture risk scores.

7. A system for diagnosing, monitoring, screening for or evaluating a musculoskeletal disease or condition, the system comprising:
a feature quantifier configured to quantify one or more features segmented and identified from a medical image of a subject;
a non-image data processor configured to extract non-image data pertaining to the subject and pertinent to the musculoskeletal disease or condition from one or more non-image data sources and to extract clinically relevant features from the non-image data;
a feature assessor configured to diagnose, monitor, screen for or evaluate the musculoskeletal disease or condition, comprising assessing the quantified features segmented from the medical image and the features extracted from the non-image data with a trained machine learning model trained to diagnose, monitor, screen for or evaluate one or more musculoskeletal diseases or conditions; and
an output configured to output one or more results of diagnosing, monitoring, screening for or evaluating the musculoskeletal disease or condition.

8. A system as claimed in claim 7, further comprising a segmenter and identifier configured to receive the image, segment one or more features from the image, and identify the features segmented from the image.

9. A system as claimed in claim 8, wherein the segmenter and identifier comprises a machine learning algorithm trained segmentation and identification model, or segmentation and identification model comprising a deep convolutional neural network trained model, configured to segment and identify the features from the image.

10. A system as claimed in claim 7, wherein the trained machine learning model
(a) is a disease classification model;
(b) is a model trained using features extracted from patient data and labels or annotations indicating disease or non-disease; and/or
(c) comprises a deep learning neural network or other machine learning algorithms.

11. A system as claimed in claim 7, further comprising a machine learning model trainer configured to update the trained machine learning model with additional labelled data derived from new or newly analysed subject data.

12. A system as claimed in claim 7, wherein the results comprise (i) one or more disease classifications; (ii) one or more disease probabilities; and/or (iii) one or more fracture risk scores.

13. A non-transitory computer-readable medium comprising computer program code, wherein the computer program code comprises instructions configured, when executed by one or more computing devices, to implement the method of claim 1.

14. A method as claimed in claim 1, wherein the disease or condition is arthritis, bone fracture, or osteomalacia.

15. A system as claimed in claim 7, wherein the disease or condition is arthritis, bone fracture, or osteomalacia.

16. A computer-implemented method of determining a treatment, or producing guidelines for treatment of, a musculoskeletal disease or condition, the method comprising
quantifying one or more features segmented and identified from a medical image of a subject;
extracting non-image data pertaining to the subject and pertinent to the musculoskeletal disease or condition from one or more non-image data sources;
extracting clinically relevant features from the non-image data;
determining a treatment, or producing guidelines for treatment of, the musculoskeletal disease or condition, comprising assessing the quantified features segmented from the medical image and the features extracted from the non-image data with a trained machine learning model trained to determine a treatment, or produce guidelines for treatment of, one or more musculoskeletal diseases or conditions; and
outputting one or more results of the determining a treatment, or producing guidelines for treatment of, the musculoskeletal disease or condition.

17. A method as claimed in claim 16, wherein the disease or condition is arthritis, bone fracture, or osteomalacia.

18. A non-transitory computer-readable medium comprising computer program code, wherein the computer program code comprises instructions configured, when executed by one or more computing devices, to implement the method of claim 16.

19. A system for determining a treatment, or producing guidelines for treatment of, a musculoskeletal disease or condition, the system comprising:
a feature quantifier configured to quantify one or more features segmented and identified from a medical image of a subject;
a non-image data processor configured to extract non-image data pertaining to the subject and pertinent to the musculoskeletal disease or condition from one or more non-image data sources and to extract clinically relevant features from the non-image data;
a feature assessor configured to determine a treatment, or produce guidelines for treatment of, the musculoskeletal disease or condition, comprising assessing the quantified features segmented from the medical image and the features extracted from the non-image data with a trained machine learning model trained to determine a treatment, or produce guidelines for treatment of, one or more musculoskeletal diseases or conditions; and
an output configured to output one or more results of the determining a treatment, or producing guidelines for treatment of, the musculoskeletal disease or condition.

20. A system as claimed in claim 19, wherein the disease or condition is arthritis, bone fracture, or osteomalacia.

* * * * *